United States Patent
Johnson et al.

(10) Patent No.: US 11,836,446 B2
(45) Date of Patent: Dec. 5, 2023

(54) DYNAMIC CREATION OF CHANGE MANAGEMENT TEMPLATES

(71) Applicant: KYNDRYL, INC., New York, NY (US)

(72) Inventors: Randy S. Johnson, O'Fallon, MO (US); Tedrick N. Northway, Wood River, IL (US)

(73) Assignee: KYNDRYL, INC., New York, NY (US)

( * ) Notice: Subject to any disclaimer, the term of this patent is extended or adjusted under 35 U.S.C. 154(b) by 1963 days.

(21) Appl. No.: 14/931,033

(22) Filed: Nov. 3, 2015

(65) Prior Publication Data
US 2017/0124060 A1    May 4, 2017

(51) Int. Cl.
| H04L 12/24 | (2006.01) |
| G06F 40/186 | (2020.01) |
| H04L 67/02 | (2022.01) |
| H04L 67/10 | (2022.01) |
| H04L 41/084 | (2022.01) |
| G06F 40/197 | (2020.01) |

(52) U.S. Cl.
CPC .......... *G06F 40/186* (2020.01); *G06F 40/197* (2020.01); *H04L 41/0843* (2013.01); *H04L 67/02* (2013.01); *H04L 67/10* (2013.01)

(58) Field of Classification Search
CPC ... G06F 17/248; G06F 17/2288; H04L 67/10; H04L 67/02
See application file for complete search history.

(56) References Cited

U.S. PATENT DOCUMENTS

| 8,131,884 | B1 * | 3/2012 | Wei | G06F 16/958 710/5 |
| 8,280,917 | B1 * | 10/2012 | Wei | G06F 16/958 707/802 |
| 8,332,248 | B2 * | 12/2012 | Hutchinson | G06Q 10/063114 705/7.11 |
| 8,683,340 | B2 | 3/2014 | Wilkins | |
| 8,738,732 | B2 * | 5/2014 | Karidi | H04L 67/22 709/218 |

(Continued)

OTHER PUBLICATIONS

W. L. d. C. Cordeiro et al., "A template-based solution to support knowledge reuse in IT change design," NOMS 2008—2008 IEEE Network Operations and Management Symposium, Salvador, Bahia, 2008, pp. 355-362.*

*Primary Examiner* — Mohammed H Zuberi
(74) *Attorney, Agent, or Firm* — Erik Swanson; Andrew M. Calderon; Calderon Safran & Cole P.C.

(57) ABSTRACT

A method of dynamically creating a change template based on a change request received from a user. A change request is assigned a category based on the specifics of the request. If at least one existing template for the category the change request is assigned does not exist, historical change requests are analyzed to identify similar changes in historical change requests to the change request and data is copied from a template used for a historical change that was similar to the change requested to create a draft template. The draft template is altered to remove information which is not relevant to the change request and is stored in a repository. The altered draft template is sent to a reviewer as a proposed template; and approved proposed templates from the reviewer are stored in the repository by category.

20 Claims, 3 Drawing Sheets

(56) References Cited

U.S. PATENT DOCUMENTS

| | | | |
|---|---|---|---|
| 8,744,887 B2 * | 6/2014 | Channabasavaiah | G06Q 10/06375 705/7.12 |
| 8,752,059 B2 * | 6/2014 | Doyle | G06F 9/5061 709/224 |
| 8,838,543 B2 | 9/2014 | Phyo et al. | |
| 8,862,491 B2 * | 10/2014 | Cope | G06Q 10/06311 705/322 |
| 8,892,539 B2 * | 11/2014 | Anand | G06F 16/3329 707/705 |
| 8,943,002 B2 * | 1/2015 | Zelenko | G06F 17/30867 706/12 |
| 8,959,507 B2 * | 2/2015 | Shen | H04L 67/34 717/172 |
| 9,229,708 B2 * | 1/2016 | Tsuji | G06F 8/70 |
| 9,269,075 B2 * | 2/2016 | Addala | G06Q 10/103 |
| 9,306,806 B1 * | 4/2016 | Zhang | H04L 41/0866 |
| 9,383,900 B2 * | 7/2016 | Flores | G06Q 10/0639 |
| 9,384,018 B2 * | 7/2016 | Du | H04L 43/50 |
| 9,436,443 B2 * | 9/2016 | Chiosi | G06F 8/35 |
| 9,507,748 B2 * | 11/2016 | Hipp | G06F 15/16 |
| 9,608,933 B2 * | 3/2017 | Emaru | H04L 47/803 |
| 9,658,901 B2 * | 5/2017 | Addala | G06F 9/542 |
| 9,672,560 B2 * | 6/2017 | Malapati | G06Q 30/0635 |
| 9,762,451 B2 * | 9/2017 | Liu | H04L 41/145 |
| 9,904,898 B2 * | 2/2018 | Addala | G06Q 10/06393 |
| 2009/0228579 A1 * | 9/2009 | Sanghvi | G06F 8/70 709/224 |
| 2010/0110933 A1 | 5/2010 | Wilcock et al. | |

* cited by examiner

DYNAMIC CREATION OF CHANGE MANAGEMENT TEMPLATES

BACKGROUND

The present invention relates to change management templates, and more specifically to dynamic creation of change management templates.

Change management is an IT service management discipline. The objective of change management in this context is to ensure that standardized methods and procedures are used for efficient and prompt handling of all changes to control IT infrastructure, in order to minimize the number and impact of any related incidents upon service. Changes in the IT infrastructure may arise reactively in response to problems or externally imposed requirements, e.g. legislative changes, or proactively from seeking improved efficiency and effectiveness or to enable or reflect business initiatives, or from programs, projects or service improvement initiatives.

Change management would typically be composed of the raising and recording of changes, assessing the impact, cost, benefit and risk of proposed changes, developing business justification and obtaining approval, managing and coordinating change implementation, monitoring and reporting on implementation, reviewing and closing change requests. Any proposed change must be approved in the change management process. While change management makes the process happen, the decision authority is a Change Advisory Board (CAB), which generally is composed of people from other functions within the organization.

The goal of the change management process is to ensure that standardized methods and procedures are used for efficient and prompt handling of all changes, in order to minimize the impact of change-related incidents upon service quality, and consequently improve the day-to-day operations of the organization.

Change management is responsible for managing change process involving: hardware; communications equipment and software; system software; and all documentation and procedures associated with the running, support and maintenance of live systems.

Currently, change templates are manually selected and created. Users enter change requests for new or changed services regularly in IT environments. Change assignees may recognize similar changes and use a change template to ensure all required activities, approvals, and coordination is performed, but many times change templates are not used and required steps or coordination are omitted, leading to last minute scrambling and increased possibility of failed changes.

SUMMARY

According to one embodiment of the present invention, a method of dynamically creating a change template based on a change request received from a user is disclosed, The method comprising the steps of: a computer assigning the change request to a category based on specifics of the change request; and the computer looking up the category assigned to the change request, to find one or more existing change templates for the category. If the computer finds at least one existing change template for the category, the computer assigning a template to the change request. If the computer does not find at least one existing template for the category, the method comprising the steps of: the computer analyzing historical change requests to identify similar changes in historical change requests to the change request; the computer copying data from a template used for a historical change that was similar to the change requested to create a draft template; the computer altering the draft template to remove information which is not relevant to the change request and storing the altered draft template in a repository; the computer sending the altered draft template to a reviewer as a proposed template; and the computer storing the approved proposed template from the reviewer in the repository.

According to another embodiment of the present invention, a computer program product for dynamically creating a change template based on a change request received from a user using a computer is disclosed. The computer comprising at least one processor, one or more memories, one or more computer readable storage media, the computer program product comprising a computer readable storage medium having program instructions embodied therewith. The program instructions executable by the computer to perform a method comprising: assigning, by the computer, the change request to a category based on specifics of the change request; and looking up, by the computer, the category assigned to the change request, to find one or more existing change templates for the category. If the computer finds at least one existing change template for the category, the assigning, by the computer, a template to the change request. If the computer does not find at least one existing template for the category, the program instructions comprising: analyzing, by the computer, historical change requests to identify similar changes in historical change requests to the change request; copying, by the computer, data from a template used for a historical change that was similar to the change requested to create a draft template; altering, by the computer, the draft template to remove information which is not relevant to the change request and storing the altered draft template in a repository; sending, by the computer, the altered draft template to a reviewer as a proposed template; and storing, by the computer, the approved proposed template from the reviewer in the repository.

According to another embodiment of the present invention, a computer system for dynamically creating a change template based on a change request received from a user is disclosed. The computer system comprising a computer comprising at least one processor, one or more memories, one or more computer readable storage media having program instructions executable by the computer to perform the program instructions. The program instructions comprising: assigning, by the computer, the change request to a category based on specifics of the change request; and looking up, by the computer, the category assigned to the change request, to find one or more existing change templates for the category. If the computer finds at least one existing change template for the category, the assigning, by the computer, a template to the change request. If the computer does not find at least one existing template for the category, the program instructions comprising: analyzing, by the computer, historical change requests to identify similar changes in historical change requests to the change request; copying, by the computer, data from a template used for a historical change that was similar to the change requested to create a draft template; altering, by the computer, the draft template to remove information which is not relevant to the change request and storing the altered draft template in a repository; sending, by the computer, the altered draft template to a reviewer as a proposed template; and storing, by the computer, the approved proposed template from the reviewer in the repository.

DETAILED DESCRIPTION

In an illustrative embodiment of the present invention, it will be recognized that by dynamically creating a change management template, the interaction of the change managers and the change assignees are reduced in order to have a change executed, necessary participants are included in a change, necessary tasks are included in a change, and improves coordination and delivery of the requested change. Furthermore, in an illustrative embodiment it will be recognized that dynamically creating a change management template improves a service delivery provider's ability to perform change management, improves change implementation results, reduces the likelihood that a required assignee is not informed of a change, and reduces the effort to manage a change.

Figure 1:
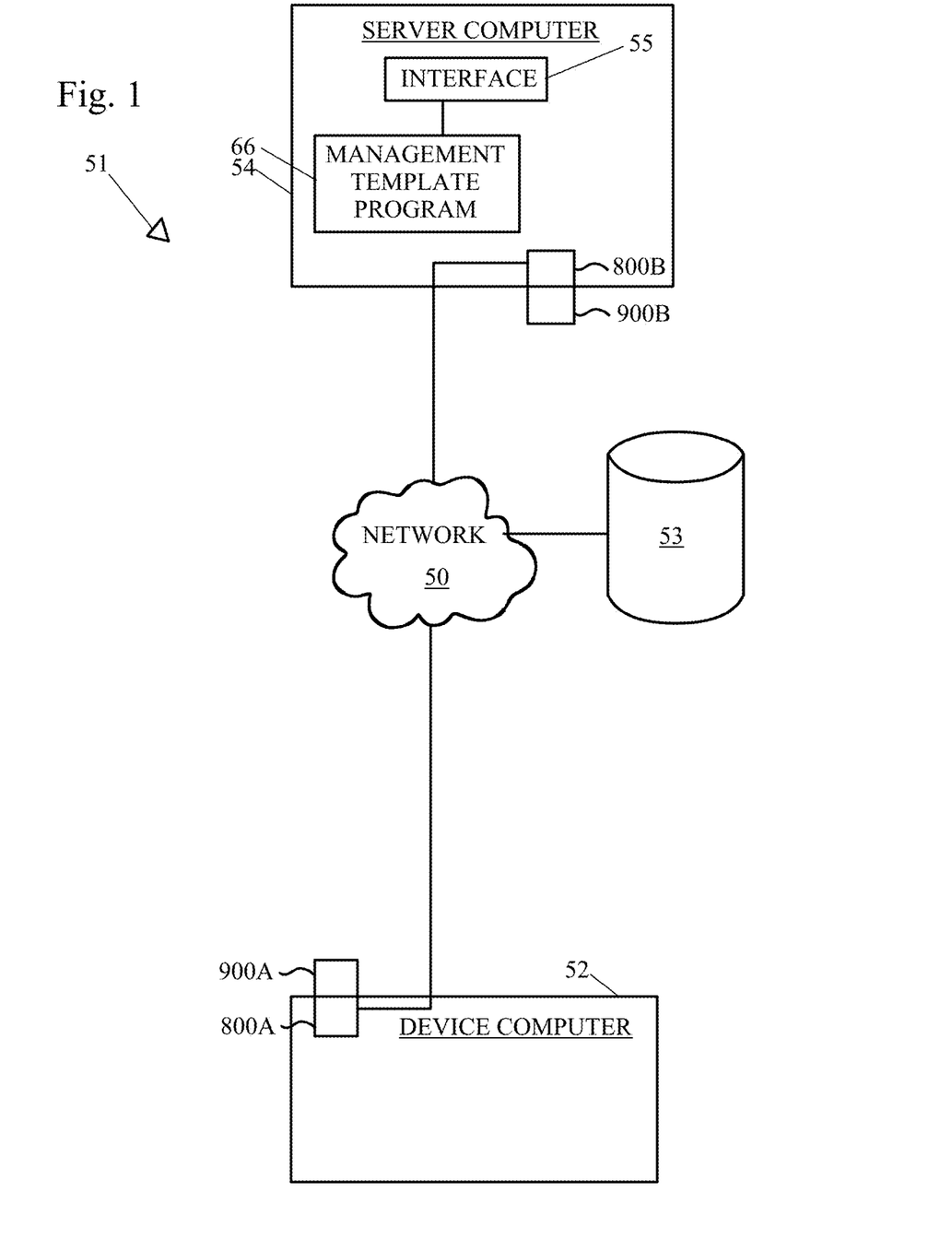
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, client computer 52, storage unit 53, and server computer 54 connect to network 50. In other exemplary embodiments, network data processing system 51 may include additional client computers, storage devices, server computers, and other devices not shown.

Client computer 52 includes a set of internal components 800a and a set of external components 900a, further illustrated in FIG. 4. Client computer 52 may be, for example, a mobile device, a personal digital assistant, a netbook, a laptop computer, a tablet computer, a desktop computer, or any other type of computing device.

Server computer 54 includes a set of internal components 800b and a set of external components 900b illustrated in FIG. 4. Server computer 54 may contain an interface 55. Through the interface 55, users may view specifics of a change request of a template, draft templates, and/or changed templates. The interface 55 may accept commands and data entry from a user, such as change requests for a template. The interface can be, for example, a command line interface, a graphical user interface (GUI), or a web user interface (WUI) through which access to a management template program 66 may be granted. Alternatively, the management template program 66 may be on client computer 52.

In the depicted example, server computer 54 provides information, such as boot files, operating system images, and applications to client computer 52. Server computer 54 can compute the information locally or extract the information from other computers on network 50.

Program code and programs such as management template program 66 may be stored on at least one of one or more computer-readable tangible storage devices 830 shown in FIG. 4, on at least one of one or more portable computer-readable tangible storage devices 936 as shown in FIG. 4, or on storage unit 53 connected to network 50, or may be downloaded to a computer, such as client computer 52 or server computer 54, for use. For example, program code and programs such as management template program 66 may be stored on at least one of one or more storage devices 830 on server computer 54 and downloaded to client computer 52 over network 50 for use on client computer 52. Alternatively, server computer 54 can be a web server, and the program code, and management template program 66 may be stored on at least one of the one or more storage devices 830 on server computer 54 and accessed on client computer 52. In other exemplary embodiments, the program code, and programs such as management template program 66 may be stored on at least one of one or more computer-readable storage devices 830 on client computer 52 or distributed between two or more servers.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

Figure 2:
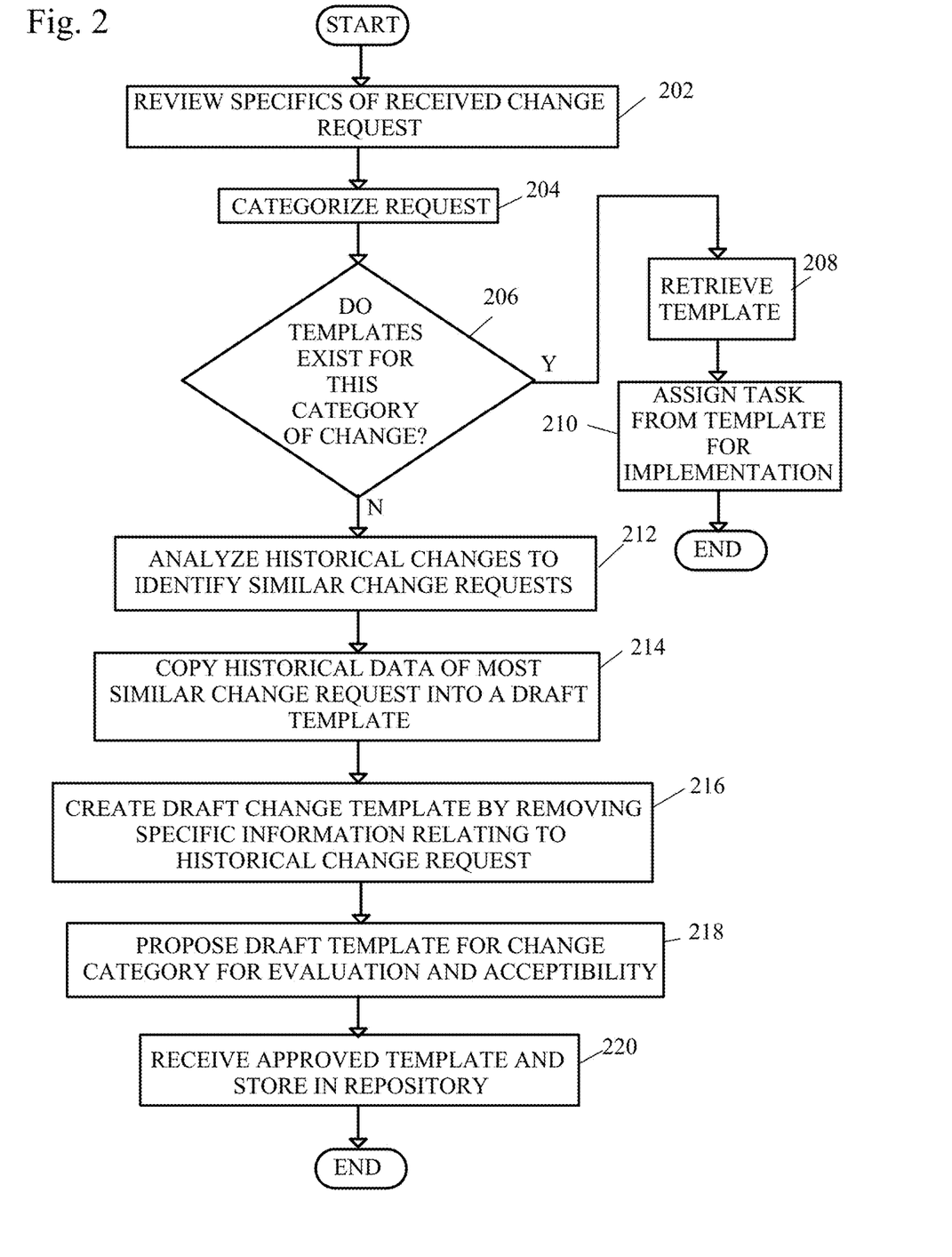
FIG. 2 shows a flow diagram of a method of dynamically creating a change management template.

FIG. 2 shows a flow diagram of a method of dynamically creating a change management template.

In a first step, a management template program 66 receives and reviews specifics of a change request sent by a user (step 202). The specifics of the change request may be identified and reviewed using conventional text analytics. The specifics may include, but are not limited to the change requested, change location, change category, change type (normal, standard, emergency, urgent) etc. . . .

A category is assigned to the change request based on the review (step 204). The categories are preferably predetermined. For example, in one embodiment, the categories may be software installation, server upgrade, application upgrade, patches, etc. . . .

If templates exist for the category of change request (step 206), the management template program 66 retrieves one or more applicable templates from a repository (step 208), for example repository 53. In one embodiment, each template contains standard tasks necessary to complete the change request, timing to implement the change, and possibly other tasks, and perhaps will identify change assignees or groups needed to perform each of the tasks in the template. In one embodiment, more than one template may be present per category of request. For example a category of server upgrade may include templates to upgrade the server depending on the operating system being run by the server e.g. Wintel, a system running a Microsoft® operating system on an x86 compatible CPU, manufactured by either Intel Corporation or Advanced Micro Devices, Inc or AIX®, a Unix operating system developed and sold by International Business Machines Corporation.

The management template program 66 assigns each of the tasks from the one or more templates for implementation by a change assignee (step 210) and the method ends.

If templates do not exist for the category of change request (step 206), the management template analyzes historical changes which were successfully implemented, to identify similar changes to the current or new change being requested (step 212). The historical changes may be analyzed by using full text analytics of the metadata associated with the change. Alternatively, if no metadata is available, the historical changes may be analyzed using full text analytics. In another embodiment, the historical changes and any associated metadata may be analyzed using data mining.

The data from a historical change that is most similar to or most highly correlated to the new or current change request is copied into a draft template (step 214). The data may be, but is not limited to tasks, assignee, change assignees needed to perform each of the tasks in the template, time needed for implementation by task, time needed to complete the entire change, and other data.

The draft template is then altered to create a change template by removing dates and other information from the prior change that do not pertain to the change request. The draft template is stored in a repository (step 216). The alteration to create the change template may, for example, remove information relating to specific users and dates, and alter the information in the change template to refer to groups instead of specific individual change assignees. It should be noted that in a preferred embodiment, the durations for implementation of individual tasks and completing the entire change itself would remain in the change template.

The draft template is then proposed to a reviewer, or possibly to some other entity such as an administrator who deals with changes in the proposed category or who manages the change categories (step 218). Approved templates are received from the reviewer and stored in a repository under the appropriate change category for future change requests (step 220), and the method ends.

Figure 3:
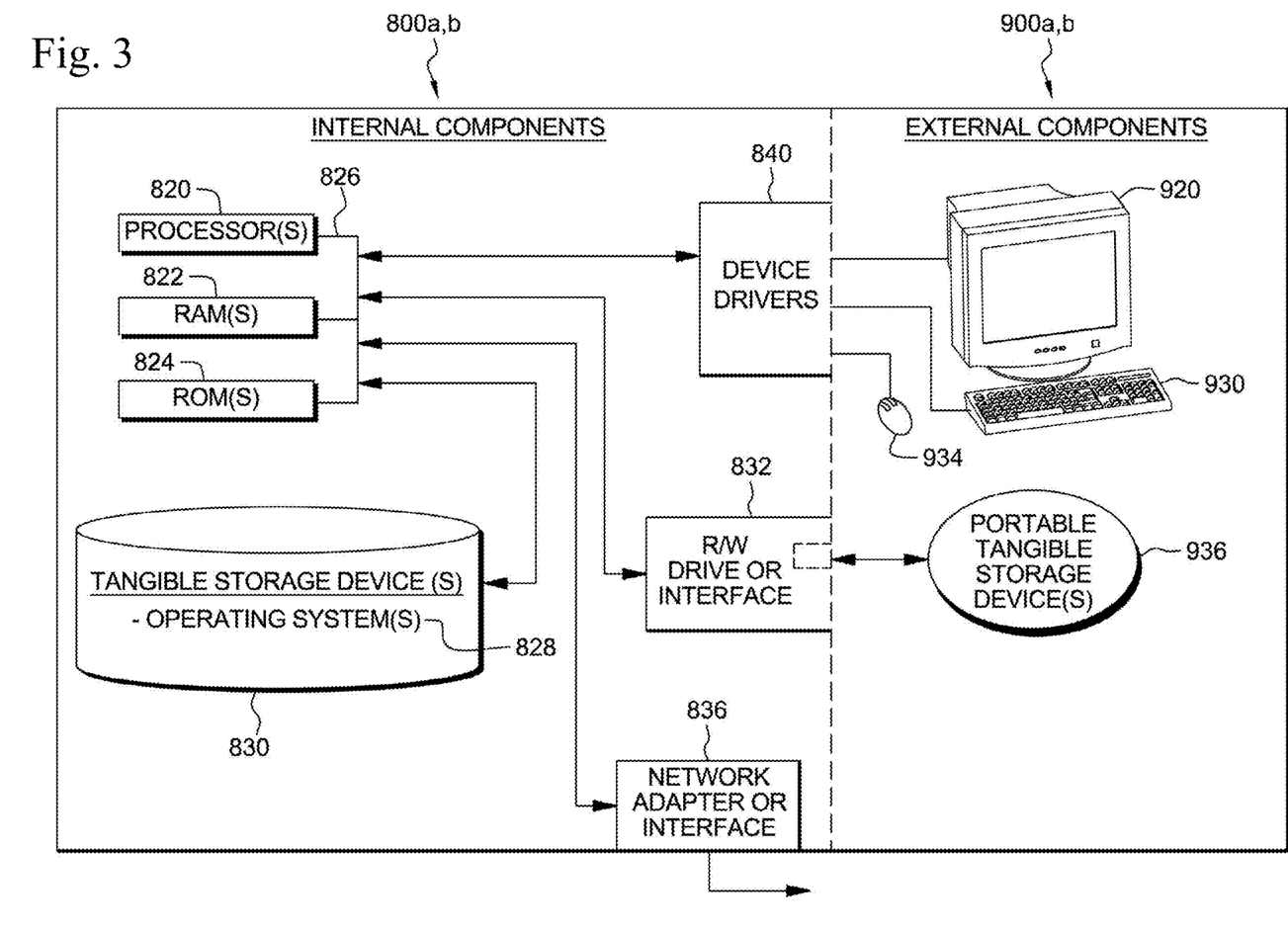
FIG. 3 illustrates internal and external components of a client computer and a server computer in which illustrative embodiments may be implemented.

FIG. 3 illustrates internal and external components of client computer 52 and server computer 54 in which illustrative embodiments may be implemented. In FIG. 4, client computer 52 and server computer 54 include respective sets of internal components 800a, 800b, and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, management template program 66 are stored on at least one of one or more of the computer-readable tangible storage devices 830 for execution by at least one of one or more of the processors 820 via at least one of one or more of the RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Management template program 66 can be stored on at least one of one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Management template program 66 can be downloaded to client computer 52 and server computer 54 from an external computer via a network (for example, the Internet, a local area network or other, wide area network) and network adapter or interface 836. From the network adapter or interface 836, management template program 66 are loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Management template program 66 can be written in various programming languages including low-level, high-level, object-oriented or non object-oriented languages. Alternatively, the functions of management template program 66 can be implemented in whole or in part by computer circuits and other hardware (not shown).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of dynamically creating a change template based on a change request received from a user, comprising the steps of:

a computer assigning the change request to a category based on specifics of the change request;

the computer looking up the category assigned to the change request, to find one or more existing change templates for the category;

if the computer finds at least one existing change template for the category, the computer assigning a template to the change request;

the computer identifying a change assignee to perform each task in the assigned template;

the computer coordinating and delivering each task in the assigned template of the change request to the identified change assignee to execute the task; and if the computer does not find at least one existing template for the category, the method comprising the steps of:

the computer collecting metadata associated with the change request, wherein the metadata is analyzed using data mining;

the computer analyzing historical change requests, wherein analyzing the historical change requests is based on the metadata analyzed using data mining, and wherein analyzing the historical change requests identifies similar changes in historical change requests to the change request;

the computer creating a draft template by copying data from a template used for a historical change that was similar to the change requested;

the computer altering the draft template to remove information which is not relevant to the change request and storing the altered draft template in a repository;

the computer sending the altered draft template to a reviewer as a proposed template; and the computer storing the approved proposed template from the reviewer in the repository.

2. The method of claim 1, wherein prior to categorization, the specifics of the change request are identified and reviewed using text analytics.

3. The method of claim 1, wherein the successful historical changes are analyzed using text analytics.

4. The method of claim 1, wherein the data copied is comprised of tasks to be completed to implement the historical change requests.

5. The method of claim 1, wherein the information removed from the draft templates is information regarding specific dates.

6. The method of claim 1, wherein the data copied is comprised of a duration of time needed to implement the historical change.

7. A computer program product for dynamically creating a change template based on a change request received from a user using a computer comprising at least one processor, one or more memories, one or more computer readable storage media, the computer program product comprising a computer readable storage medium having program instructions embodied therewith, the program instructions executable by the computer to perform a method comprising:
assigning, by the computer, the change request to a category based on specifics of the change request;
looking up, by the computer, the category assigned to the change request, to find one or more existing change templates for the category;
if the computer finds at least one existing change template for the category, the assigning, by the computer, a template to the change request;
identifying, by the computer, a change assignee to perform each task in the assigned template;
coordinating and delivering, by the computer, each task in the assigned template of the change request to the identified change assignee to execute the task; and
if the computer does not find at least one existing template for the category, the program instructions comprising:
collecting metadata associated with the change request, wherein the metadata is analyzed using data mining;
analyzing, by the computer, historical change requests, wherein analyzing the historical change requests is based on the metadata analyzed using data mining, and wherein analyzing the historical change requests identifies similar changes in historical change requests to the change request;
creating, by the computer, a draft template by copying data from a template used for a historical change that was similar to the change requested;
altering, by the computer, the draft template to remove information which is not relevant to the change request and storing the altered draft template in a repository;
sending, by the computer, the altered draft template to a reviewer as a proposed template; and
storing, by the computer, the approved proposed template from the reviewer in the repository.

8. The computer program product of claim 7, wherein prior to categorization, the specifics of the change request are identified and reviewed using text analytics.

9. The computer program product of claim 7, wherein the successful historical changes are analyzed using text analytics.

10. The computer program product of claim 7, wherein the data copied is comprised of tasks to be completed to implement the historical change requests.

11. The computer program product of claim 7, wherein the information removed from the draft templates is information regarding specific dates.

12. The computer program product of claim 7, wherein the data copied is comprised of a duration of time needed to implement the historical change.

13. A computer system for dynamically creating a change template based on a change request received from a user comprising a computer comprising at least one processor, one or more memories, one or more computer readable storage media having program instructions executable by the computer to perform the program instructions comprising:
assigning, by the computer, the change request to a category based on specifics of the change request;
looking up, by the computer, the category assigned to the change request, to find one or more existing change templates for the category;
if the computer finds at least one existing change template for the category, the assigning, by the computer, a template to the change request;
identifying, by the computer, a group to perform each task in the template to improve coordination and delivery of the change request;
coordinating and delivering, by the computer, each task in the assigned template of the change request to the identified change assignee to execute the task; and
if the computer does not find at least one existing template for the category, the program instructions comprising:
collecting metadata associated with the change request, wherein the metadata is analyzed using data mining;
analyzing, by the computer, historical change requests, wherein analyzing the historical change requests is based on the metadata analyzed using data mining, and wherein analyzing the historical change requests identifies similar changes in historical change requests to the change request;
creating, by the computer, a draft template by copying data from a template used for a historical change that was similar to the change requested;
altering, by the computer, the draft template to remove information which is not relevant to the change request and storing the altered draft template in a repository;
sending, by the computer, the altered draft template to a reviewer as a proposed template; and
storing, by the computer, the approved proposed template from the reviewer in the repository.

14. The computer system of claim 13, wherein prior to categorization, the specifics of the change request are identified and reviewed using text analytics.

15. The computer system of claim 13, wherein the successful historical changes are analyzed using text analytics.

16. The computer system of claim 13, wherein the data copied is comprised of tasks to be completed to implement the historical change request.

17. The computer system of claim 13, wherein the information removed from the draft templates is information regarding specific dates.

18. The computer system of claim 13, wherein the data copied is comprised of a duration of time needed to implement the historical change.

19. The method of claim 1, further comprising:
assigning each task to the identified change assignee for implementation,
wherein the creating of the draft template includes participants and tasks necessary to execute the change request, and analyzing of the historical change requests that were successfully implemented and further including utilization of full text analytics on the metadata associated with the historical change requests.

20. The computer program product of claim 7, wherein the program instructions are further executable by the computer to perform the method comprising:
- assigning each task to the identified change assignee for implementation,
- wherein the creating of the draft template includes n participants and tasks necessary to execute the change request, and
- analyzing of the historical change requests that were successfully implemented and further including utilization of full text analytics on the metadata associated with the historical change requests.

\* \* \* \* \*